United States Patent
Ike et al.

(10) Patent No.: US 8,405,712 B2
(45) Date of Patent: Mar. 26, 2013

(54) GESTURE RECOGNITION APPARATUS AND METHOD THEREOF

(75) Inventors: Tsukasa Ike, Tokyo (JP); Yasukazu Okamoto, Hyogo (JP); Satoru Ishigaki, Tokyo (JP); Kei Sakamoto, Tokyo (JP); Masahiro Fujita, Kanagawa (JP); Hisashi Kazama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 969 days.

(21) Appl. No.: 12/233,693

(22) Filed: Sep. 19, 2008

(65) Prior Publication Data

US 2009/0153655 A1 Jun. 18, 2009

(30) Foreign Application Priority Data

Sep. 25, 2007 (JP) ................................. 2007-247421

(51) Int. Cl.
*H04N 7/18* (2006.01)
*G06K 9/00* (2006.01)

(52) U.S. Cl. ......................................... 348/77; 382/103

(58) Field of Classification Search .................. 715/700, 715/863; 345/156–184; 342/28, 114; 382/103, 382/107, 122, 216, 236; 348/154, 155; 725/12; 352/39; 396/153
See application file for complete search history.

(56) References Cited

U.S. PATENT DOCUMENTS

| | | | |
|---|---|---|---|
| 6,215,890 B1 * | 4/2001 | Matsuo et al. | 382/103 |
| 2002/0102024 A1 | 8/2002 | Jones et al. | |
| 2002/0103776 A1 * | 8/2002 | Bella et al. | 706/49 |
| 2004/0042661 A1 * | 3/2004 | Ulrich et al. | 382/181 |
| 2004/0190776 A1 * | 9/2004 | Higaki et al. | 382/190 |
| 2005/0271279 A1 * | 12/2005 | Fujimura et al. | 382/203 |
| 2006/0013483 A1 * | 1/2006 | Kurzweil et al. | 382/176 |
| 2006/0085414 A1 * | 4/2006 | Chai et al. | 707/5 |

FOREIGN PATENT DOCUMENTS

JP 2004-78977 3/2004

* cited by examiner

*Primary Examiner* — Peling Shaw
(74) *Attorney, Agent, or Firm* — Finnegan, Henderson, Farabow, Garrett & Dunner, L.L.P.

(57) ABSTRACT

A gesture recognition apparatus including a detector, a controller and a gesture recognizer, and is able to detect a portion to be detected using an image captured at a first resolution without reducing the number of images to be entered per unit of time to an object detector by detecting an auxiliary portion instead when the portion to be detected is not detected at a second resolution, estimating the position of the auxiliary portion based on the position of the auxiliary portion, and extracting the periphery thereof from the image captured at the first resolution.

11 Claims, 5 Drawing Sheets

GESTURE RECOGNITION APPARATUS AND METHOD THEREOF

CROSS-REFERENCE TO RELATED APPLICATION

This application is based upon and claims the benefit of priority from the prior Japanese Patent Application No. 2007-247421, filed on Sep. 25, 2007; the entire contents of which are incorporated herein by reference.

FIELD OF THE INVENTION

The present invention relates to a gesture recognition apparatus which captures an image of a part or an entire part of a body of an operator and recognizes the position of a portion and the posture of the body by image processing and a method thereof.

DESCRIPTION OF THE INVENTION

Nowadays, interface devices for controlling apparatuses such as television sets or computers are generally operated via command devices such as remote controllers, keyboards or mouse devices. However, these types of interface devices are adapted to be operated via the command devices, therefore, an operator might have trouble understanding the operation intuitively. When the operator has lost the command device, the interface device cannot be used.

Therefore, as one of the interface devices which may solve the problem as described above, a technology relating to a gesture user interface device which realizes the operation of the equipment without using the command devices by the operator by moving a part or an entire part of the body or by changing his/her posture is proposed.

For example, JP-A-2004-78977 (KOKAI) discloses an interface device which recognizes the shape or the movement of a hand (hand gesture) of the operator from an image including the operator captured by a CCD camera arranged in a display and carries out a display control such as to change the shape or the position of a command icon displayed on a screen based on the recognition, so that a command indicated by hand gestures is enabled.

In general, in the device which recognizes a gesture from input images as the device disclosed in JP-A-2004-78977 (KOKAI), it is necessary that an image area which corresponds to the portion of the body of the operator has at least a predetermined size in the input images in order to recognize gestures of the operator. Therefore, the maximum distance of gestures that the device recognizes depends on the resolution of the image entered into the device. Therefore, by increasing the resolution of the image entered into the device, recognition of gestures made at a position farther from the device is enabled.

However, there is generally a limit in data quantity which may be entered into the device per unit of time. When the resolution is increased without changing a capturing area included in the input image, the number of pixels which constitute the input images increases, so that the number of images which may be entered into the device per unit of time may be reduced. Accordingly, in the interface device based on the gesture recognition, there is a problem such that the device cannot respond immediately to a gesture made by the operator, so that the operability may be impaired.

On the other hand, in order to increase the resolution while maintaining a constant number of pixels which constitute the input images, it is necessary to narrow the capturing area included in the input images. Consequently, the range to be recognized in the horizontal direction and in the vertical direction of a hand recognized by a gesture recognition apparatus is narrowed, and hence there also arises a problem that the operability may be impaired.

BRIEF SUMMARY OF THE INVENTION

In view of such problems as described above, it is an object of the invention to provide a gesture recognition apparatus which is able to recognize gestures made at a position farther from the apparatus without reducing the number of images to be entered into the apparatus per unit of time or narrowing the range to be recognized and a method thereof.

According to embodiments of the invention, there is provided a gesture recognition apparatus including a first detector configured to detect a detection area including a portion of a body of an operator in a first image of a motion image captured at a first resolution; a second detector configured to detect an auxiliary area including an auxiliary portion used for detecting the portion in a second image of the motion image captured at the first resolution when the detection area cannot be detected; a controller configured to control, when the auxiliary area is detected, to cause a capturing unit to capture a third image of the motion image captured at a second resolution higher than the first resolution; a third detector configured to detect the detection area in the third image based on a predetermined positional relationship between the detection area and the auxiliary area; and a gesture recognizer configured to recognize a gesture of the portion based on an entire area of the first image or the detection area of the third image.

DETAILED DESCRIPTION OF THE INVENTION

Referring now to FIG. 1 to FIG. 8, a gesture recognition apparatus according to an embodiment of the invention will be described.

Figure 1:
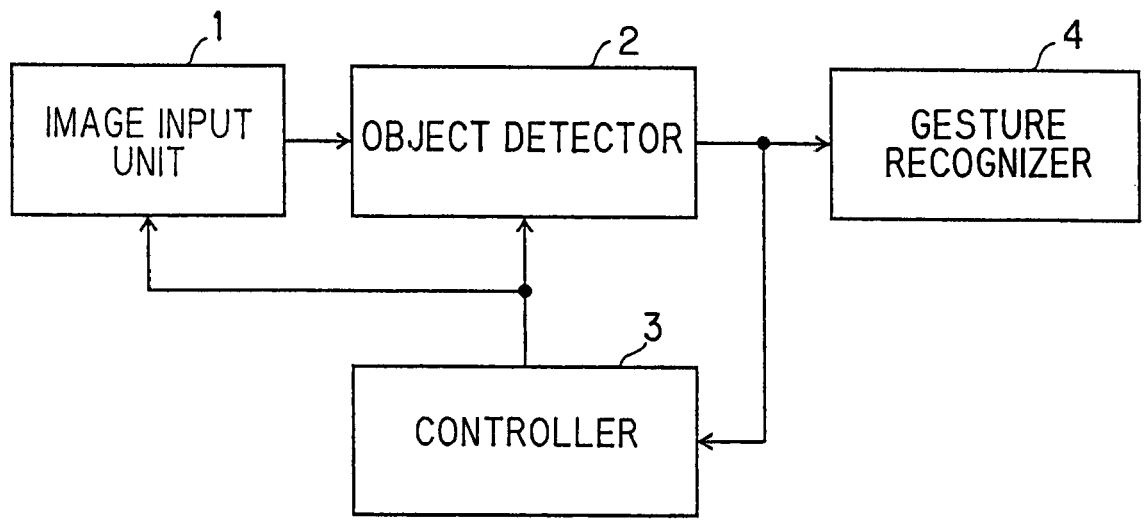
FIG. 1 illustrates a configuration of a gesture recognition apparatus according to an embodiment of the invention.

FIG. 1 is a block diagram illustrating a configuration of a gesture recognition apparatus according to a first embodiment.

The gesture recognition apparatus includes an image input unit 1, an object detector 2, a controller 3 and a gesture recognizer 4.

The image input unit 1 inputs a motion image including a part or an entire part of a body of an operator using a capturing device such as a CCD camera and supplies the same to the object detector 2.

The object detector 2 detects a given number of portions to be detected and auxiliary portions from the entered motion image, and outputs an area including each of detected portions as a detection area and an auxiliary area. Here, the portion to be detected is a portion of the body of the operator as an object to be recognized in the gesture recognition apparatus, and the auxiliary portion is another portion of the body of the operator used for detecting the portion to be detected. For example, by using the hand of the operator as the portion to be detected and the face of the operator as the auxiliary portion, it is considered that the position and the size of the hand of the operator are estimated by detecting the face of the operator, when the hand of the operator cannot be detected.

The controller 3 controls the resolution of the images entered by the image input unit 1 and the capturing area based on a detected result outputted by the object detector 2.

The gesture recognizer 4 recognizes a gesture based on the detected portion to be detected.

Functions of the respective components 1 to 4 may be implemented by a program stored in a computer.

Figure 2:
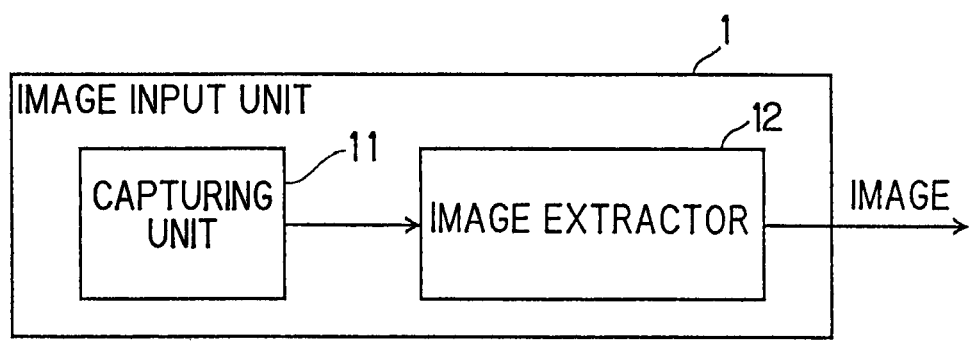
FIG. 2 is a block diagram illustrating an exemplary configuration of an image input unit.

FIG. 2 shows an exemplary configuration of the image input unit 1.

The capturing unit 11 captures images including the operator, using the capturing device such as the CCD camera, for example. The capturing unit 11 here is assumed to have a function of capturing the images captured at two kinds of resolutions including, for example, a low resolution and a high resolution.

An image extractor 12 extracts a given area of the image outputted by the capturing unit 11 and outputs the area.

As an exemplary configuration of the object detector 2, for example, an object evaluating device disclosed in US Patent Publication No. 2002/0102024 will be described as a reference.

Figure 3:
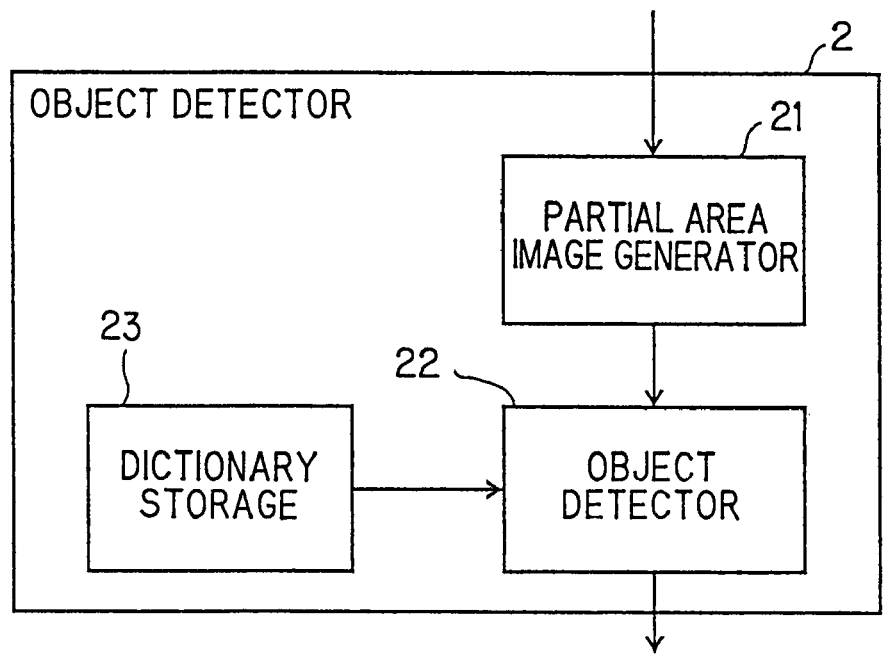
FIG. 3 is a block diagram illustrating an exemplary configuration of an object detector.

FIG. 3 is a block diagram of the object detector 2. As shown in FIG. 3, the object detector 2 includes a partial area image generator 21, an object detector 22 and dictionary storage 23.

Figure 4:
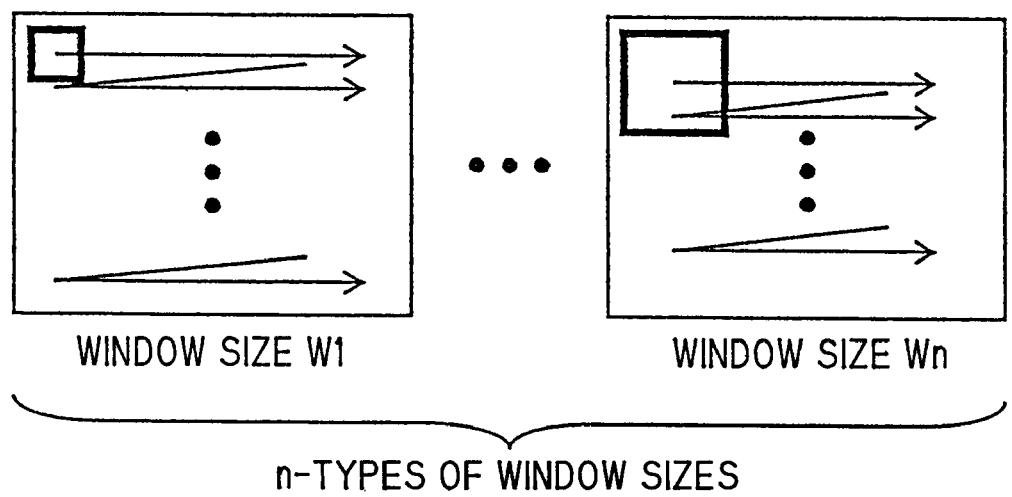
FIG. 4 is a drawing for explaining a partial area generated by a partial area generator.

The partial area image generator 21 sets partial areas of various sizes at various positions on an input image, and extracts the images in the partial areas and supplies the same to the object detector 22. Here, the partial areas are set by preparing n-types of window sizes and scanning a screen for each of these window sizes as shown in FIG. 4.

The object detector 22 normalizes the partial area images given as an input into a predetermined size, and determines whether it is the object or not using dictionary data stored in the dictionary storage 23.

Figure 5:
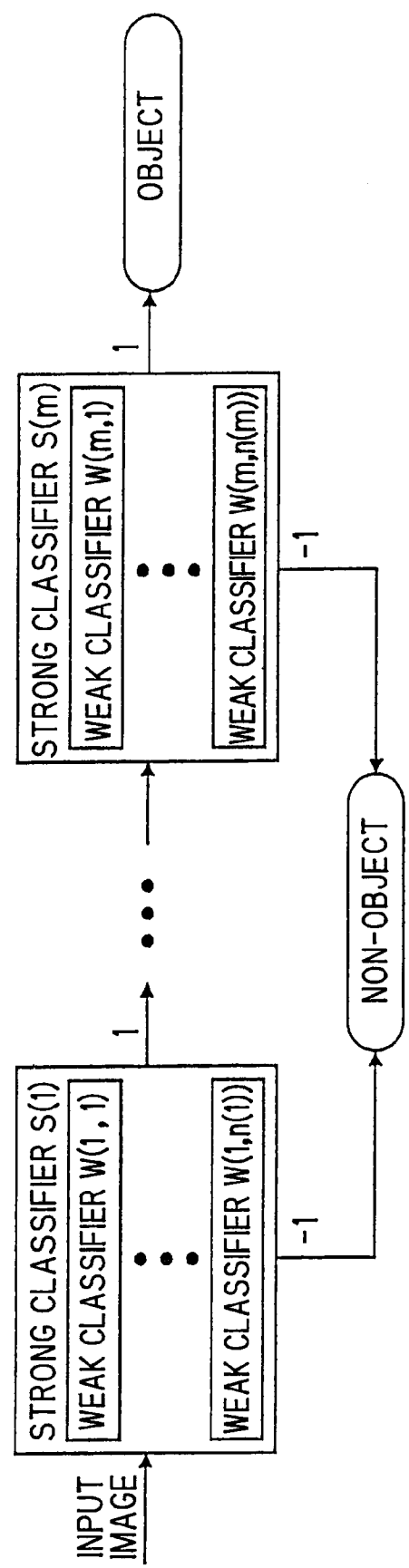
FIG. 5 is a drawing for explaining a method of detecting an object by an object detector.

Determination of whether it is the object or not is carried out by m pieces of strong classifiers S(1), . . . , S(m) arranged in series as shown in FIG. 5. Each of the strong classifiers S includes n(m) pieces of weak classifiers W (1), . . . , W(n), and each weak classifier W determines whether it is the object or not by evaluating a specific portion in the normalized input images.

The each strong classifier S totally evaluates a result of determination by the n(m) pieces of weak classifiers W included therein and determines whether it is the object or not. Only when all the strong classifiers S arranged in series determine that it is the object, the object detector 22 defines the input image as the object.

Figure 6:
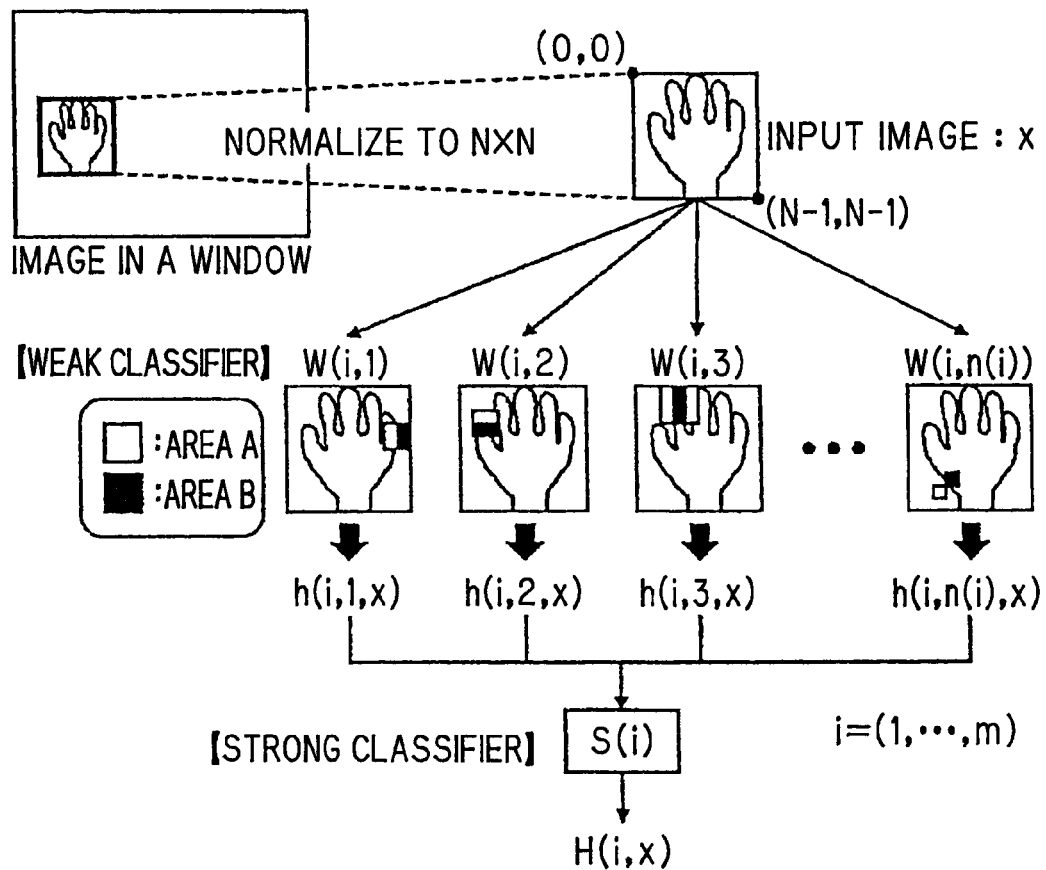
FIG. 6 is a drawing for explaining the method of detecting an object by the object detector.

Referring now to FIG. 6, the method of evaluating an input image by the weak classifier W will be described.

The partial area image provided as an input is normalized into a size of N×N, and is determined whether it is the object or not by the respective weak classifiers W (i, 1), . . . , W(i, n(i)) which constitute a strong classifier i.

The object determination is carried out by obtaining the sums SA and SB of the luminance values of all the pixels in each of an area A and an area B defined for each weak classifier W, and comparing the difference with an object determination threshold value T. Here, the area A and the area B are expressed by one or two rectangular area(s) as shown in FIG. 6. Specific positions and the shapes of the area A and the area B and the object determination threshold value T which allow effective discrimination between the object and non-object are selected in advance based on a training using an object image and a non-object image.

The results of determination h(i, j, x) by these weak classifiers W are obtained using an expression (1) shown below:

$$h(i, j, x) = \begin{cases} 1 & \text{if } p(i, j) \cdot (S_A(i, j, x) - S_B(i, j, x)) > T(i, j) \\ -1 & \text{otherwise,} \end{cases} \quad (1)$$

where $S_A(i, j, x)$, $S_B(i, j, x)$ and $T(i, j)$ are the sums of the luminance values of the area A and area B when an input image x is given in the weak classifier Wj which constitutes the strong classifier Si and the object determination threshold value, respectively.

$P(i, j) = \{1, -1\}$ describes a parity and, when $p(i, j) = -1$, it is determined as an object when the $S_A(i, j, x) - S_B(i, j, x)$ is smaller than $T(i, j)$.

Determination by the strong classifier i will be described.

A result of determination H of the strong classifier i (i, x) is obtained from a result of evaluation h (i, j, x) by the each weak classifier W using an expression (2) shown below:

$$H(i, x) = \begin{cases} 1 & \text{if } \sum (\alpha(i, j) \cdot h(i, j, x)) \geq 0 \\ -1 & \text{otherwise,} \end{cases} \quad (2)$$

where $\alpha$ (i, j) is a reliability of the weak classifier W (i, j), which is defined based on the percentage of right answer in a training image.

A final result of determination C(x) in the object detector 22 is expressed by an expression (3) shown below, $$C(x) = \begin{cases} 1 & \text{if } H(i, x) = 1 \text{ for } i = \{1, \ldots, m\} \\ -1 & \text{otherwise.} \end{cases} \quad (3)$$

Then, when C(x) is 1, it is determined as the object.

When it is determined whether a plurality of types of objects are the object or not, the classifier is prepared for each object, and the process of determination as described above is carried out for each object.

The description shown above is an exemplary method of recognizing gestures, and is not intended to limit the invention to the method described above. For example, a method of evaluating the similarity of a model image with respect to an outline image generated from the input image or a method of evaluating the similarity of the pattern in a skin color area in the input image may also be employed.

The controller 3 controls the resolution and the capturing area of the image entered by the image input unit 1 based on the positions and the sizes of the portion to be detected and the auxiliary portion detected by the object detector 2.

Figure 7:
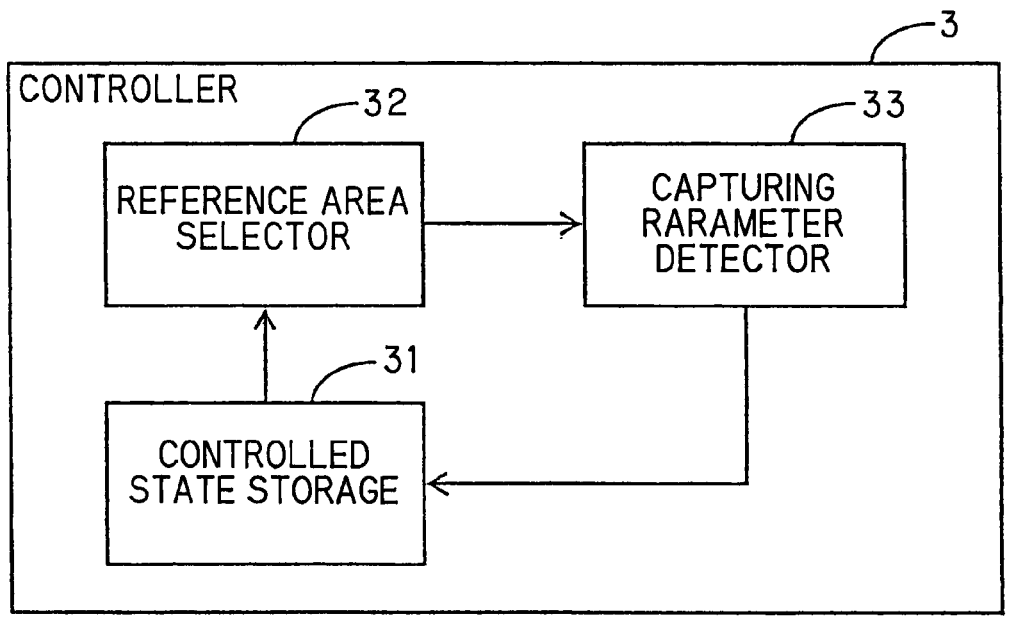
FIG. 7 is a block diagram illustrating an exemplary configuration of a controller.

Referring now to FIG. 7, an exemplary control method carried out by the controller 3 will be described. As shown in FIG. 7, the controller 3 includes a controlled state storage 31, a reference area selector 32 and a capturing parameter detector 33.

The controlled state storage 31 stores a controlled state of the image input unit 1 in a current frame. Here, the controlled state includes, for example, the resolution and the capturing area of the image.

The reference area selector 32 selects an area which serves as a reference when defining a capturing parameter of the image input unit 1 in the next frame from the portion to be detected and the auxiliary portion detected by the object detector 2 according to the controlled state in the current frame stored in the controlled state storage 31.

The capturing parameter detector 33 defines the capturing parameter in the next frame based on the size and the name of classification of the reference area selected by the reference area selector 32 and outputs the capturing parameter to the image input unit 1.

Figure 8:
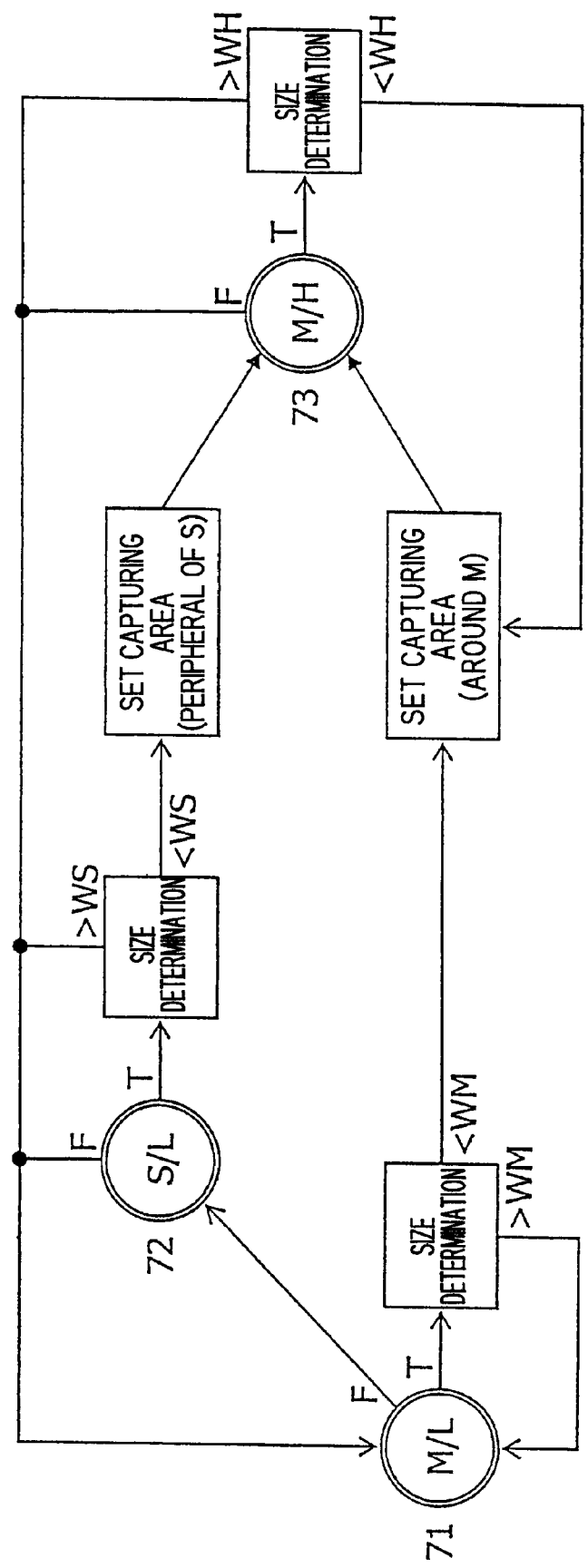
FIG. 8 is a drawing for explaining a control carried out by the controller.

Referring now to FIG. 8, an operation of the controller 3 will be described. Here, a case in which the portion to be detected and the auxiliary portion are the hand and the face of the operator, respectively, will be described. FIG. 8 is a state transition diagram of the controller 3.

In the respective states in FIG. 8, reference signs M and S represent the types of the areas to be selected by the reference area selector 32 in the next frame. The reference area selector 32 selects the detection area in the state of M, and the auxiliary area in the state of S as the reference area. Reference signs L and H represent the resolutions of the image input unit 1 in the next frame, which is outputted by the capturing parameter detector 33. The reference sign L represents a low resolution and the reference sign H represents a high resolution.

The control 3 is in a state 71 when the operation of the gesture recognition apparatus is started.

When the controller 3 is in the state 71, the capturing unit 11 generates an image by setting the resolution to the low resolution and capturing on the resolution. This image is referred to as a first image. The image extractor 12 does not extract the first image but uses the first image as a first input image.

The object detector 2 detects a portion to be detected (hand) from the first input image. Areas including the respective detected portions to be detected are outputted as detection areas. The reference area selector 32 selects a first reference area from the detection areas based on a first reference. An area including the hand is selected as the first reference area.

It is considered that the first reference in the reference area selector 32 is selected by configuring the object detector 2 to output the probabilities of the respective detection areas to be the object and selecting an area with the highest probability or, when the detection area is detected in the previous frame, selecting an area closest to the detected detection area. The first input image may be used as the first reference area as is.

The capturing parameter detector 33 determines whether or not the size of the area including the hand which is selected by the reference area selector 32 is larger than a predetermined threshold value. When it is larger than the threshold value, it is determined that the hand will be detected with the low resolution image also in the next frame, and the controller 3 continues the state 71. Accordingly, the capturing parameter detector 33 sets the resolution in the next frame to the low resolution.

When the area including the hand is smaller than the threshold value, it is determined that it will be difficult to detect the hand with the low resolution image in the next frame, and the controller 3 is transferred to a state 73. Accordingly, the capturing parameter detector 33 sets the resolution in the next frame to the high resolution.

On the other hand, when the object detector 2 does not detect the hand, the detection area does not exist and hence the reference area selector 32 is not able to select the first reference area.

The reason why the hand is not detected might be because the hand does not exist in the capturing area of the capturing unit 11, or the area including the hand in the first image captured at the low resolution is too small since the hand is far from the capturing unit 11.

In the latter case, for example, the hand is likely to be detected by estimating the approximate position of the hand by detecting a portion which is larger than the hand, such as the face of the operator, and is at a correlative position with respect to the position of the hand, and then detecting the hand using the image captured at the high resolution while confining the capturing area to the peripheral area thereof. Then, since the data size of the input image may be limited by confining the capturing area to the peripheral area of the estimated position of the hand, the hand at a farther position may be detected without reducing the number of images which may be entered per unit of time.

Then, the controller 3 proceeds to a state 72 for detecting the face.

When the controller 3 proceeds to the state 72, the capturing unit 11 generates a second image by capturing with the resolution set to the low resolution. The second image is a frame next to the first image. The image extractor 12 does not extract the image and uses the second image as a second input image.

The object detector 2 detects an auxiliary portion (face) from the second input image and, areas which include the respective detected auxiliary portions are outputted as auxiliary areas. The reference area selector 32 selects a second reference area based on a second reference from the auxiliary areas.

It is considered that the second reference in the reference area selector 32 is selected by configuring the object detector 2 to output the probabilities of the respective detection areas to be the object and selecting an area with the highest probability. The auxiliary areas may be used as the second reference area as is.

When the reference area (the area including the face) is selected by the reference area selector 32, whether the size of the reference area is smaller than a predetermined threshold value WS or not is determined. When the size of the reference area is smaller than WS, it is determined that the size of the area including the hand is as small as it cannot be detected with the low resolution image, so that the controller 3 proceeds to the state 73. In other words, the capturing parameter detector 33 sets the resolution in the next frame to the high resolution, and confines the image extracting range to a certain range including the area which likely includes the hand based on the position of the reference area.

When the size of the reference area is larger than WS, and when the reference area is not selected, it is determined that the hand does not exist within the capturing range of the capturing unit 11, and the controller 3 returns to the state 71. The case in which the size of the reference area is larger than WS is considered to be the case in which the face is shown fully in the image. Then, the capturing parameter detector 33 sets the resolution in the next frame to the low resolution, and sets the image extracting range to the entire capturing area.

When the controller 3 is in the state 73, the capturing unit 11 generates a third image by capturing with the resolution set to the high resolution. The third image is the next frame of the second image. The image extractor 12 generates a third input image by extracting the capturing area defined from the third image by the capturing parameter detector 33. The object detector 2 detects the portion to be detected (hand) from the third input image and areas which include the respective portions to be detected thereby detected are outputted as detection areas.

When the state is proceeded from the state 72, the approximate position of the hand is estimated by detecting a portion which is at a correlative position with respect to the area of the face, and confining the capturing area to the peripheral area thereof so that the detection area is determined.

The reference area selector 32 selects a third reference area from the detection area of the third image captured at the high resolution based on a predetermined third reference. It is considered that the third reference in the reference area selector 32 is selected, for example, by configuring the object detector 2 to output the probabilities of the respective detection areas to be the object and selecting the area with the highest probability or, when the detection area is detected in the previous frame, selecting an area closest to the detected detection area. The detection area may be used as the third reference area as is.

When the reference area selector 32 selects the third reference area (area including the hand), whether the size of the third reference area is smaller than a predetermined threshold value WH or not is determined.

When the size of the third reference area is larger than WH, it is determined that the portion to be detected may be detected even from the low resolution image, and the controller 3 returns to the state 71. In other words, the capturing parameter detector 33 sets the resolution in the next frame to the low resolution and the image extracting range is set to the entire capturing area.

When the size of the third reference area is smaller than WH, it is determined that the portion to be detected can only be detected from the high resolution image, and the controller 3 maintains to be in the state 73. In other words, the capturing parameter detector 33 sets the resolution in the next frame to the high resolution, and confines the image extracting range to a certain range including the area which likely includes the hand based on the position of the third reference area.

When the third reference area is not selected, it is determined that the hand does not exist in the capturing area of the capturing unit 11, and the controller 3 returns to the state 71.

The gesture recognizer 4 recognizes gestures based on the movement of the hand which is the portion to be detected, which is detected by being controlled by the controller 3.

In other words, when the hand is recognized in the state 71, the first image captured at the low resolution from the object detector 2 is entered therein, where the area of the hand from the first image captured at the low resolution is recognized again, so that the gesture is recognized from the shape of the recognized hand. As the gesture recognition, a method of recognition described in JP-A-2004-78977 (KOKAI) may be employed as well.

When the hand is recognized in state 73, the third reference area extracted from the third image captured at the high resolution is entered from the object detector 2, the area of the hand is recognized from the third reference area at the high resolution again, and the gesture is recognized from the shape of the recognized hand. As the gesture recognition, a method of recognition described in JP-A-2004-78977 (KOKAI) may also be employed as well.

As described above, in the gesture recognition apparatus according to the embodiments of the invention, when the portion to be detected is not detected at the low resolution, the auxiliary portion is detected instead and, based on the position of the auxiliary portions, the position of the auxiliary portion is estimated and the portion near the auxiliary portions is extracted from the image captured at the high resolution, the portion to be detected is detected using the image captured at the high resolution without reducing the number of images to be entered per unit of time to the object detector 2.

Accordingly, gestures at a position farther from the gesture recognition apparatus may be recognized without sacrificing the processing speed.

The invention is not limited to the embodiments shown above, and may be modified in various manner as long as it does not depart from the scope of the invention.

In the description of the embodiments shown above, the resolution is classified into to levels. However, the invention is not limited thereto, and the capturing unit 11 which is capable of capturing at three or more levels of resolution may be employed.

For example, a case in which the resolution is divided into three levels; the low resolution, an intermediate resolution, and the high resolution will be described. In this case, when the face area is not detected at the low resolution in the state 72, the state is not returned to the state 71, and the face area is detected at the intermediate resolution and, when the detection is successful, the area of the hand is detected at the high resolution in the state 73.

In the embodiments shown above, the controller 3 changes the resolution in the next frame. However, when the processing speed of the controller 3 is slow and hence is delayed, the resolution may be changed at the $k^{th}$ frame ahead considering the extent of delay. However, k is larger than one. In this case, the capturing unit 11 does not change the resolution at every frame, but changes the resolution every $k^{th}$ frames.

In the embodiments shown above, the second image used in the state 72 is used the image in the frame next to the first image. However since the detection is made with the same low resolution image, the first image may be employed as is.

What is claimed is:

1. A gesture recognition apparatus comprising:
   a first detector configured to detect a detection area including a portion of a body of an operator in a first image of a motion image captured at a first resolution;
   a second detector configured to detect an auxiliary area including an auxiliary portion used for detecting the portion in a second image of the motion image captured at the first resolution when the detection area cannot be detected from the first image of the motion image;
   a physical controller configured to control, when the auxiliary area is detected, a capturing unit to capture a third image of the motion image, which is an image in the frame next to the second image and is captured at a second resolution higher than the first resolution, by capturing an area estimated from a predetermined positional relationship between the portion of a body and the auxiliary portion;
   a third detector configured to detect the detection area in the third image; and
   a gesture recognizer configured to recognize a gesture of the portion based on an entire area of the first image when the detection area is detected from the first image and based on the detection area of the third image when the detection area cannot be detected from the first image.

2. The apparatus according to claim 1, wherein the second image used in the second detector is an image in a frame next to the first image, or the same image as the first image.

3. The apparatus according to claim 1, wherein the third image used in the third detector is an image in a frame next to the second image.

4. The apparatus according to claim 1, wherein the auxiliary area detected by the second detector is an area having a larger size than the detection area.

5. The apparatus according to claim 1, wherein the portion to be detected is the hand of the operator and the auxiliary area is the face of the operator.

6. The apparatus according to claim 1, further comprising an image input unit which is configured to change the resolution for each or every some frames when inputting the motion image.

7. A computer-implemented method of recognizing gestures comprising:
- detecting a detection area including a portion of a body of an operator in a first image of a motion image captured at a first resolution;
- detecting an auxiliary area including an auxiliary portion used for detecting the portion in a second image of the motion image captured at the first resolution when the detection area cannot be detected from the first image of the motion image;
- controlling, when the auxiliary area is detected and using a physical controller, a capturing unit to capture a third image of the motion image, which is an image in the frame next to the second image and is captured at a second resolution higher than the first resolution, by capturing an area estimated from a predetermined positional relationship between the portion of the body and the auxiliary portion;
- detecting the detection area in the third image; and
- recognizing a gesture of the portion based on an entire area of the first image when the detection area is detected from the first image and based on the detection area of the third image when the detection area cannot be detected from the first image.

8. A non-transitory computer-readable medium storing a set of instructions that when executed by processor perform a method, the method comprising:
- detecting a detection area including a portion of a body of an operator in a first image of a motion image captured at a first resolution;
- detecting an auxiliary area including an auxiliary portion used for detecting the portion in a second image of the motion image captured at the first resolution when the detection area cannot be detected from the first image of the motion image;
- controlling, when the auxiliary area is detected and using a physical controller, a capturing unit to capture a third image of the motion image, which is an image in the frame next to the second image and is captured at a second resolution higher than the first resolution by capturing an area estimated from a predetermined positional relationship between the portion of the a body and the auxiliary portion;
- detecting the detection area in the third image; and
- recognizing a gesture of the portion based on an entire area of the first image when the detection area is detected from the first image and based on the detection area of the third image when the detection area cannot be detected from the first image.

9. A gesture recognition apparatus according to claim 1, wherein the controller is configured to detect the detection area from an image in a frame next to the second image by the first detector when the second detector cannot detect the auxiliary area.

10. A gesture recognition apparatus according to claim 1, wherein the controller is configured to detect the detection area from an image in a frame next to the second image by the first detector when the size of the auxiliary area is larger than the threshold value.

11. A gesture recognition apparatus according to claim 1, wherein the controller is configured to control, when the size of the auxiliary area is larger than the threshold value, a capturing unit to capture a third image of the motion image, which is an image in the frame next to the second image and is captured at a second resolution higher than the first resolution, based on an area estimated from a predetermined positional relationship between the portion of a body and the auxiliary portion.

* * * * *